(12) United States Patent
Alkordi et al.

(10) Patent No.: US 9,853,270 B2
(45) Date of Patent: Dec. 26, 2017

(54) NANOSTRUCTURED METAL ORGANIC MATERIAL ELECTRODE SEPARATORS AND METHODS THEREFOR

(71) Applicant: KING ABDULLAH UNIVERSITY OF SCIENCE AND TECHNOLOGY, Thuwal (SA)

(72) Inventors: Mohamed Helmi Alkordi, Thuwal (SA); Mohamed Eddaoudi, Thuwal (SA)

(73) Assignee: King Abdullah University of Science and Technology, Thuwal (SA)

(*) Notice: Subject to any disclaimer, the term of this patent is extended or adjusted under 35 U.S.C. 154(b) by 507 days.

(21) Appl. No.: 13/861,775

(22) Filed: Apr. 12, 2013

(65) Prior Publication Data

US 2013/0280611 A1 Oct. 24, 2013

Related U.S. Application Data

(60) Provisional application No. 61/625,973, filed on Apr. 18, 2012.

(51) Int. Cl.
| | | |
|---|---|---|
| *H01M 4/50* | (2010.01) | |
| *H01M 2/16* | (2006.01) | |
| *H01M 2/14* | (2006.01) | |

(52) U.S. Cl.
CPC ....... *H01M 2/1673* (2013.01); *H01M 2/1653* (2013.01); *H01M 4/50* (2013.01); *H01M 2/145* (2013.01); *Y10T 29/49115* (2015.01)

(58) Field of Classification Search
CPC ............ H01M 4/50; H01M 4/13; H01M 4/14; H01M 4/24; H01M 4/64; H01M 2/1673; H01M 2/1653; H01M 2/145; H01M 10/04; Y10T 29/49115
See application file for complete search history.

(56) References Cited

U.S. PATENT DOCUMENTS

| | | |
|---|---|---|
| 5,378,571 A | 1/1995 | Macholdt |
| 6,624,318 B1 | 9/2003 | Mueller et al. |
| 6,893,564 B2 * | 5/2005 | Mueller et al. ............ 210/502.1 |
| 6,929,679 B2 | 8/2005 | Mueller et al. |
| 6,930,193 B2 | 8/2005 | Yaghi et al. |
| 7,196,210 B2 | 3/2007 | Yaghi et al. |
| 7,279,517 B2 | 10/2007 | Mueller et al. |
| 7,880,026 B2 | 2/2011 | Ni et al. |
| 7,981,818 B2 | 7/2011 | Justice |

(Continued)

OTHER PUBLICATIONS

International Search Report and Written Opinion for PCT/US2013/036329 dated Jul. 25, 2013.

(Continued)

*Primary Examiner* — Raymond Alejandro
(74) *Attorney, Agent, or Firm* — Billion & Armitage; Benjamin Armitage

(57) ABSTRACT

Provided herein are nanostructured electrode separators comprising metal organic materials capable of attaching to one or more electrodes and electrically insulating at least one electrode while allowing migration of ionic charge carriers through the nanostructured electrode separator. Methods of using such electrode separators include positioning a nanostructured electrode separator between two electrodes of an electrochemical cell.

17 Claims, 13 Drawing Sheets

(56) References Cited

U.S. PATENT DOCUMENTS

| | | |
|---|---|---|
| 8,034,952 B2 | 10/2011 | Eddaoudi et al. |
| 8,119,295 B2 | 2/2012 | Drew et al. |
| 8,123,834 B2 | 2/2012 | Masel et al. |
| 8,680,231 B2 | 3/2014 | Po et al. |
| 2003/0222023 A1 | 12/2003 | Mueller et al. |
| 2009/0148760 A1 | 6/2009 | Justice |
| 2009/0305040 A1* | 12/2009 | Schubert et al. ............ 428/402 |
| 2010/0132547 A1 | 6/2010 | Masel et al. |
| 2010/0266897 A1* | 10/2010 | Lee ..................... B82Y 10/00 429/219 |
| 2011/0139331 A1 | 6/2011 | Arora et al. |
| 2011/0143173 A1 | 6/2011 | Drew et al. |
| 2011/0287316 A1* | 11/2011 | Lu ....................... B82Y 30/00 429/215 |
| 2011/0319573 A1 | 12/2011 | Po et al. |
| 2012/0003475 A1* | 1/2012 | Benin et al. ................. 428/402 |
| 2012/0028086 A1 | 2/2012 | Shi et al. |
| 2012/0077092 A1* | 3/2012 | Lee et al. ..................... 429/307 |
| 2012/0082884 A1 | 4/2012 | Orilall et al. |
| 2013/0115453 A1* | 5/2013 | Fan ..................... H05K 1/0213 428/372 |

OTHER PUBLICATIONS

International Preliminary Report on Patentability for PCT/US2013/036329 dated Oct. 21, 2014.

Kundu, et al., "Alkali earth metal (Ca, Sr, Ba) based thermostable metal-organic frameworks (MOFs) for proton conduction", Chem. Commun., 2012, 48, pp. 4998-5000., Mar. 27, 2012.

* cited by examiner

NANOSTRUCTURED METAL ORGANIC MATERIAL ELECTRODE SEPARATORS AND METHODS THEREFOR

CLAIM OF PRIORITY

This application claims the benefit of prior U.S. Provisional Application No. 61/625,973, filed on Apr. 18, 2012, which is incorporated by reference in its entirety.

TECHNICAL FIELD

This invention relates to an electrode separator for use in a battery or an electrochemical cell.

BACKGROUND

Batteries and electrochemical cells can be used as sources of energy. Generally, batteries and electrochemical cells include a positive electrode, a negative electrode, a separator between the positive electrode and the negative electrode that prevents electrical contact between the two electrodes, and an electrolytic solution in contact with the electrodes and separator that permits ion migration. Electrons flow from electrode to electrode via a conductor. The physical and chemical properties of the separator can affect the performance properties of the battery or electrochemical cell.

SUMMARY

A separator for a battery or electrochemical cell can be a nanostructured separator.

In one aspect, an electrode material includes an electrode substrate and a nanostructured separator on a surface of the electrode substrate.

In another aspect, an electrochemical cell comprising an electrode substrate, a nanostructured separator on a surface of the electrode substrate and a second electrode in contact with the nanostructured separator.

In another aspect, a method of forming an electrode material includes forming the nanostructured separator on a surface of the electrode support.

In another aspect, a method of forming an electrochemical cell includes forming the nanostructured separator on a surface of the electrode support and contacting the nanostructured separator with the second electrode.

In certain embodiments, the nanostructured separator can include a metal-organic material. The metal-organic material can be a metal-organic framework, a metal-organic polyhedron, or a coordination polymer.

In other embodiments, the nanostructured separator can be a covalent-organic framework.

In certain embodiments, the nanostructured separator can include a zinc or lead coordination compound, for example, a zinc terephthalate metal-organic framework or a lead-(4, 4'-sulfonyldibenzoate) metal-organic framework. In other embodiments, the nanostructured separator can include a 2,5-thiophenediboronicacid covalent-organic framework.

In certain aspects, the electrode substrate can be a manganese oxide.

Advantageously, the nanostructured separator can allow for unprecedented control over ion conductivity and related performance characteristics of batteries or electrochemical cells.

Other aspects, embodiments, and features will be apparent from the following description, the drawings, and the claims.

DETAILED DESCRIPTION

Figure 1:
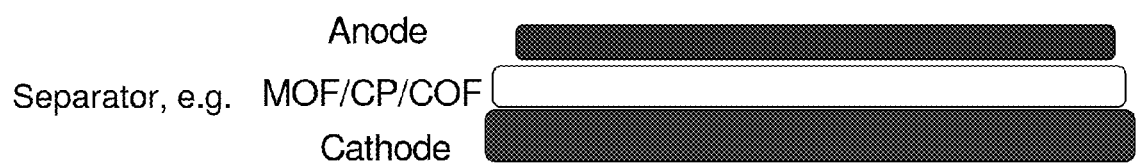
FIG. 1 is a diagram illustrating a portion of a battery or an electrochemical cell.

Referring to FIG. 1, a battery or electrochemical cell can include a cathode, an anode and a separator between the cathode and anode. The battery or electrochemical cell can be contained within a suitable housing (not shown).

The battery and electrochemical cell include a primary cell or a non-rechargeable battery or a secondary cell or rechargeable battery. Examples of a primary cell includes an alkaline battery, aluminum battery, chromic acid cell, Clark cell, Daniell cell, dry cell, Earth battery, Galvanic cell, Grove cell, Leclanché cell, lithium battery, lithium air battery, mercury battery, molten salt battery, nickel oxyhydroxide battery, oxyride battery, organic radical battery, paper battery, Pulvermacher's chain reserve battery, silver-oxide battery, solid-state battery, voltaic pile, penny battery, trough battery, water-activated battery, Weston cell, zinc-air battery, zinc-carbon battery, or zinc chloride battery. Examples of a secondary cell includes a flow battery, vanadium redox battery, zinc-bromine flow battery, fuel cell, lead-acid battery, deep cycle battery, VRLA battery, AGM battery, gel battery, lithium air battery, lithium-ion battery, Beltway battery, lithium ion polymer battery, lithium iron phosphate battery, lithium-sulfur battery, lithium-titanate battery, molten salt battery, nickel-cadmium battery, nickel-cadmium battery, vented cell type nickel hydrogen battery, nickel-iron battery, nickel metal hydride battery, low self-discharge NiMH battery, nickel-zinc battery, organic radical battery, polymer-based battery, polysulfide bromide battery, potassium-ion battery, rechargeable alkaline battery, silicon air battery, sodium-ion battery, sodium-sulfur battery, super iron battery, zinc-bromine flow battery, or zinc matrix battery.

The primary function of an electrode separator is to sever as an electrical insulator between a positive electrode and a negative electrode (for example, a cathode and an anode, respectively) to prevent migration of electrons from electrode to electrode through the separator while allowing for migration of ionic charge carriers through the separator. The migration of ionic charge completes the electrical circuit, permitting passage of current from positive electrode to negative electrode in an electrochemical cell.

A nanostructured material, such as a metal-organic material (MOM), including a metal-organic framework (MOF), a metal-organic polyhedron (MOP), or a coordination polymer (CP), or a covalent-organic framework (COF) can serve as separator between electrodes in a battery or electrochemical cell.

Metal-organic materials and coordination polymers refer to a large family of solids characterized by the nature of coordination bonding between metal ions and organic linkers. The metal ions can include alkali metals, rare-earth metals, transition metals, lanthanides, or post-transition metals. Organic linkers can include any organic molecule capable of formation of coordination or ionic bond to metal ions. Organic linkers generally possess functional groups like carboxylic acids, amines, azoles, oxazoles, thiols, thiazoles and other heteroatom groups capable of bonding to a metal ion. MOMs and CPs can exhibit various structures ranging from discrete supermolecules (known also as metal-organic polyhedra, MOPs) to chains to layers and sheets to 3D structures. MOMs and CPs can exhibit permanent porosity as indicated by reversible gas sorption isotherms and/or reversible guest exchange behavior.

Covalent-organic frameworks refer to a large family of solids characterized by the nature of covalent bonding between organic monomers. The organic monomers can contain metal ions include alkali metals, rare-earth metals, transition metals, lanthanides, or post-transition metals. Organic monomers include any organic molecule capable of formation of covalent bonds to the same molecule to form homo-polymer or other type of molecules to form hetero-polymer. Organic monomers generally possess functional groups like carboxylic acids, amines, azoles, oxazoles, thiols, thiazoles, terminal alkynes, halogenated aromatics like iodo/bromo benzenes, boronic acids, aldehydes, amides, acyl halides or other functional groups. COFs can exhibit various structures ranging from discrete supermolecules to chains to layers and sheets to 3D structures. COFs can exhibit permanent porosity as indicated by reversible gas sorption isotherms and/or reversible guest exchange behavior.

Figure 2A:
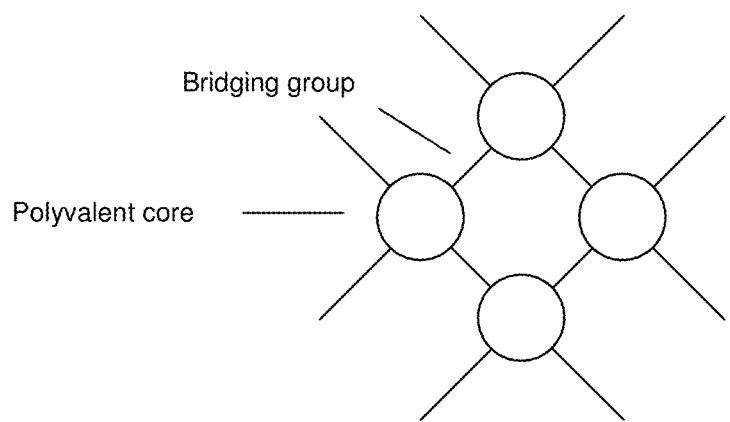
FIGS. 2A, 2B and 2C are diagrams illustrating a lattice structure that can be built to create a nanostructured separator.
Figure 2B:
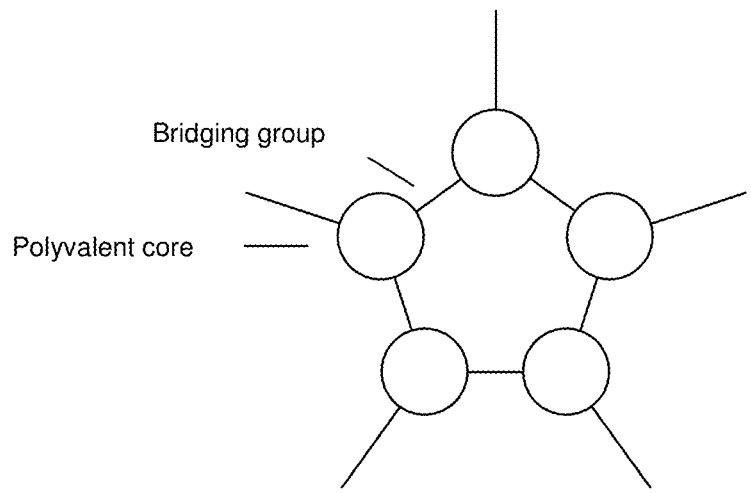
Figure 2C:
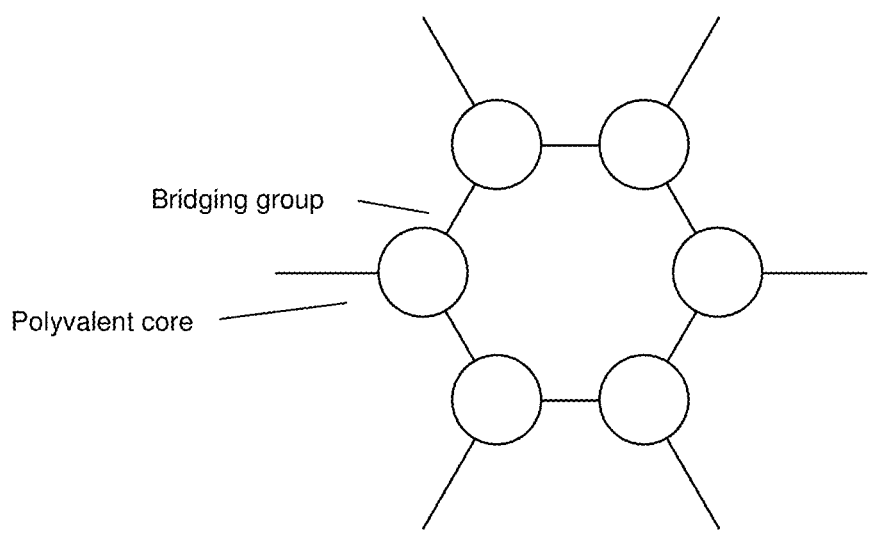

A nanostructured separator is a separator that has nanometer or sub-nanometer sized features that provide the nanostructured separator with particular properties that can enhance the performance of a battery or electrochemical cell. In general, the nanostructured separator can be built from a framework of molecular structures depicted in FIGS. 2A, 2B and 2C, and combinations thereof. In these structures, there is a polyvalent core, which can be a metal ion, atom, or other moiety capable of bonding with 2, 3, 4, 5, 7, 8, 9, 10, 11 or 12 bridging groups to form a scaffold. The bonds can be covalent bonds, ionic bonds or dative bonds, or combinations thereof. The scaffold or regions thereof can be one-, two- or three-dimensional in structure and can consist of the various bonding motifs shown in FIGS. 2A, 2B and 2C.

The polyvalent core can be carbon, silicon, a di-, tri-, or quadravalent organic moiety (for example, carbon atom, ethylene group, aryl group, and the like), or a metal ions of one or more main group element or transition metal including ions of Li, Na, K, Cs, Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Ti, Si, Ge, Sn, Pb, As, Sb, or Bi.

The bridging group can be a polydentate group, for example, a C2-12 hydrocarbon chain optionally containing at least one double bond, at least one triple bond, or at least one double bond and one triple bond and optionally interrupted by at least one —O—, —N(Rc)-, or S, or C3-16 cyclic group, optionally aromatic and optionally heterocyclic, the briding group being optionally substituted with alkyl, alkenyl, alkynyl, alkoxy, hydroxyl, hydroxylalkyl, halo, haloalkyl, amino, carboxyl, amido, C1-4 alkyl, C2-4 alkenyl, C2-4 alkynyl, C1-4 alkoxy, nitro, cyano, C3-5 cycloalkyl, 3-5 membered heterocycloalkyl, monocyclic aryl, 5-6 membered heteroaryl, C1-4 alkylcarbonyloxy, C1-4 alkyloxycarbonyl, C1-4 alkylcarbonyl, or formyl group, which is capable of bonding to 2, 3, 4, 5, or 6, or more, of the polyvalent cores. Rc can be H or C1-4 alkyl.

The nanostructured separator can have a permanent porosity, high surface area and appropriate chemical, thermal and physical stability suitable of use in a battery or electrochemical cell. In other embodiments, enclathrated or encapsulated guest molecules or ions can undergo guest exchange with other molecular or ionic species in the nanostructured separator to alter properties of the separator. The surface area may be determined by using the BET method ("BET surface area"). This refers to the Brunauer, Emmett and Teller (BET) method for surface area determination, which utilizes the isothermal adsorption of nitrogen to measure total surface area of a material. Another method uses the Langmuir model. Thermal stability can be determined using differential scanning calorimetry (DSC), differential thermal analysis (DTA), or thermogravimetric analysis (TGA). Porosity can be determined by porosimetry measurements.

The nanostructured separator can include designable and tunable pore sizes, pore distribution and pore shape. In another embodiment, the nanostructured separator can include designable and tunable pore functionality. For example, accessible voids inside the porous material can incorporate a variety of guest molecules, ions or gases of desirable functionality for the nanostructured separator. In another embodiment, the nanostructured separator can include a designable and tunable composition of the organic/inorganic parts of the separator, which can provide control and enhancement in the design and selection of suitable material specific electrochemical systems. In another embodiment, the nanostructured separator can have a neutral or charged backbone (cationic or anionic) where in charged backbone the presence of encapsulated/enclathrated counterions can provide control and enhancement in the design and selection of suitable material specific electrochemical systems. The high crystallinity of the nanostructured separator enables accurate structural characterization and control of desirable properties including ion conductivity, ion exchange, or void dimensions.

For example, the nanostructured separator can have channels/cages/windows within a relatively wide range in diameter (0.5~5 nm), or with a wide range of surface area (few $m^2/g$ to several hundred $m^2/g$. The nanostructured separator can demonstrate good thermal stability (usually stable to 200° C.~300° C.) and chemical stability (stable against structural disintegration in neutral, acidic, or basic solutions.

The nanostructured separator should be thick enough to reduce or eliminate shorting between the positive electrode and the negative electrode by impedance or by preventing electrode dendrite formation. It is important that the nanostructured separator also allow for facile ion migration between the positive electrode and the negative electrode. For example, the pore size in the nanostructured separator must be small enough to avoid formation of dendrites through the membrane, but large enough to permit ion migration. The impedance of the nanostructured separator should be high enough to prevent electrical shorting between the positive electrode and the negative electrode while optimizing the efficiency of the battery or electrochemical cell. For example, the average pore diameter of the nanostructured separator can be less than 20 nm, less than 10 nm, less than 5 nm, less than 1 nm, or greater than 0.5 nm. The average thickness of the nanostructured separator can be less than 100 microns, less than 50 microns, less than 10 microns, less than 1 micron, less than 500 nm, less than 200 nm, less than 100 nm, less than 50 nm, less than 40 nm, less than 30 nm, less than 20 nm, less than 10 nm, less than 5 nm, less than 1 nm, or greater than 0.5 nm.

Materials appropriate for use for the nanostructured separator can include a metal-organic material (MOM), including a metal-organic framework (MOF), a metal-organic polyhedron (MOP), or a coordination polymer (CP), or a covalent-organic framework (COF) that is substantially inert to the electrolytic solution and capable of reducing or eliminating electron transfer between electrodes. The nanostructured separator can include wettable material coatings, polymers, gels, or fillers such as, for example, inorganic particles, biopolymers, polysaccharides, cellulose, dixtrans, cyclodextrins, silicates, or nanoparticles.

Examples of possibly suitable nanostructured materials include the metal-organic framework materials described, for example, in U.S. Pat. Nos. 8,123,834, 8,034,952, 7,880, 026, 7,279,517, 6,929,679, 6,893,564, and 6,624,318, each of which is incorporated by reference in its entirety. The design of pores in metal organic framework materials is described, for example, in U.S. Pat. Nos. 7,196,210, and 6,930,193, each of which is incorporated by reference in its entirety. Other examples of possibly suitable nanostructured materials are described, for example, in T. Kundu, et al., ChemComm 2012, DOI: 10.1039/c2cc31135f, which is incorporated by reference in its entirety.

The MOFs described in U.S. Pat. No. 8,123,834 include Zn-MOF1, Zn-MOF2, Zn-MOF3, Zn-MOF4, ZnMOF5, Cu-MOF1, Cu-MOF2, Tb-MOF1, Tb-MOF2, Cd-MOF1, Cd-MOF2, CdMOF3, Co-MOF1, Co-MOF2, Zn-MOF6, MOF-5, $Cu(4,4'-bpy)_{1.5}NO_3(H_2O)_{1.25}$, IRMOF2, $[Cu_3(TMA)_2]_n$, $[Cu(OH)—(C_5H_4NCO_2)]$, MOF-38, $Ag(4,4'-bpy)NO3$, IRMOF3 and IRMOF7, among others.

The MOFs described in U.S. Pat. No. 8,034,952 include supramolecular assemblies comprising a 1:8 ratio of a supramolecular polyhedral building block and a triangular molecular building block, which form a (3,24)-connected rht net, among others. The supermolecular polyhedral building block has points of extension corresponding to the vertices of a rhombicuboctahedron (and other regular polyhedra that have 24 vertices and the edge skeleton shared by small rhombihexahedron, small cubicuboctahedron, and rhombicuboctahedron) for linking the supermolecular polyhedral building block to the triangular building blocks. In the assembly, an individual supermolecular polyhedral building block is linked to twenty-four different triangular building blocks and an individual triangular building block is linked to three different supermolecular polyhedral building blocks with the linkages comprising covalent bonds, coordinate covalent bonds, noncovalent bonds, or a combination thereof.

The MOFs described in U.S. Pat. No. 7,880,026 include IRMOF-1, IRMOF-2, IRMOF-3, Zn-MOF-1, Zn-MOF-2, Zn-MOF-3, Zn-MOF-4, Zn-MOF-5, Cu-MOF-1, Cu-MOF-2, Tb-MOF-1, Tb-MOF-2, Cd-MOF-1, Cd-MOF-2, Cd-MOF-3, Co-MOF-1, Co-MOF-2, Zn-MOF-6, MOF-5, $Cu(4,4'-bpy)_{1.5}NO_3(H_2O)_{1.25}$, $[Cu_3(TMA)_2]_n$, $[Cu(OH)—(C_5H_4NCO_2)]_n$, MOF-38, $Ag(4,4'-bpy)NO_3$, and IRMOF-7, among others.

Referring again to FIG. 2, the battery or electrochemical cell can include three layers. The first layer can be a substrate, and can be one electrode of the battery or the electrochemical cell. The nanostructured separator can be grown on a substrate, such as a first electrode of a battery or electrochemical cell. For example, the nanostructured separator can be grown on an anode material. The substrate can be any solid support, for example, a porous, conductor, semi-conductor, magnetic, metallic, non-metallic, photoactive, polymer, or heat responsive material. The substrate can be conducting, semiconducting or insulating. The substrate can be quartz, diamond, silica, alumina, a metal oxide, a metal hydroxide, a metal in elemental state or other suitable material. The substrate can be amorphous, polycrystalline, or a single crystal. The substrate surface in contact with the nanostructured separator can have a polished, rough, patterned, or functionalized surface, for example, with surface-active molecules (SAMs). Each electrode, independently, can include a metal, metal oxide, metal salt, metal complex, metal nanoparticle, molten salt or gas.

The second layer can be a nanostructured separator. The nanostructured separator can be any MOF, MOP, CP, or COF of desirable structure or functionality. For example, the nanostructured separator can be non-porous, microporous, or mesoporous. The nanostructured separator can form chains, sheets, or a 3D polymer or crystalline network. In addition, the nanostructured separator can be neutral, anionic, or cationic and can include different counterions, combining any one or more metal, transition metal, lanthanides, alkaloids, rare-earth metals, chalcogenides, and one or more organic molecule as linker. In certain embodiments, the nanostructured separators can include accessible voids inside the structure, which can be empty or occupied by guest molecules that can be solvent, organic substance, counterions, ionic species, gases, or other species. The dimension and chemical composition of the nanostructured separator along with the nature of optional enclosed guest molecules or ions can provide control over ion migration characteristics through the separator, thus enabling enhancement and/or control of the battery or electrochemical cell performance.

The third layer can be the second electrode, or cathode, of the battery or electrochemical cell. The second electrode can be any solid support, for example, a porous, conductor, semi-conductor, magnetic, metallic, non-metallic, photoactive, polymer, or heat responsive material. The second electrode can be conducting, semiconducting or insulating. The second electrode can be quartz, diamond, silica, alumina, a metal oxide, a metal hydroxide, a metal salt, a metal in elemental state, metalloid, or other suitable material. The second electrode can be amorphous, polycrystalline, or a single crystal. The second electrode surface in contact with the nanostructured separator can have a polished, rough, patterned, or functionalized surface, for example, with surface-active molecules (SAMs). The second electrode can be metals, metal oxides, metal salts, metal complexes, metalloid, metal or metalloid nanoparticles, molten salts or gases. The second electrode can be electrochemically complementary to the first electrode. For example, the first electrode can be a manganese oxide and the second electrode can be lithium.

Each of the anode or cathode can be fabricated through a variety of techniques such as pressing from powder, chemical or electrical plating or deposition, spray deposition, monolith, sputtering, or casting. The nanostructured separator, such as MOM, CP, or COF can be deposited on one or more of the anode or cathode through solvothermal syntheses, spraying, dry grinding, vapor deposition, pellets pressing, or printing. The nanostructured separator can be deposited as phase pure material or as a mixture with other ingredients in the form of composite material. Alternatively, the nanostructured separator can include a MOM, CP or COF supported inside cavities or channels of a gel, a sol-gel, a porous inorganic support, or an organic polymer.

Examples of fabricating a nanostructured separator follow. In one example, a thin film of the nanostructured separator can be formed on a pressed pellet of manganese oxide, which can be used as an electrode in battery or electrochemical cell.

Example 1

180 mg of finely grinded $MnO_2$ was pressed at 15,000 lb/inch to prepare the solid support. A mixture of terephthalic acid (0.5 mmol, 83 mg) and $Zn(NO_3)_2 \cdot 6H_2O$ (1 mmol, 297 mg) was prepared and dissolved in N,N'-diethylformamide (5 mL) and 1 mL of this mixture added to the support in a closed vial, heated at 105° C. for 12 h to result in a homogenous coverage of the substrate by the MOF.

Figure 3A:
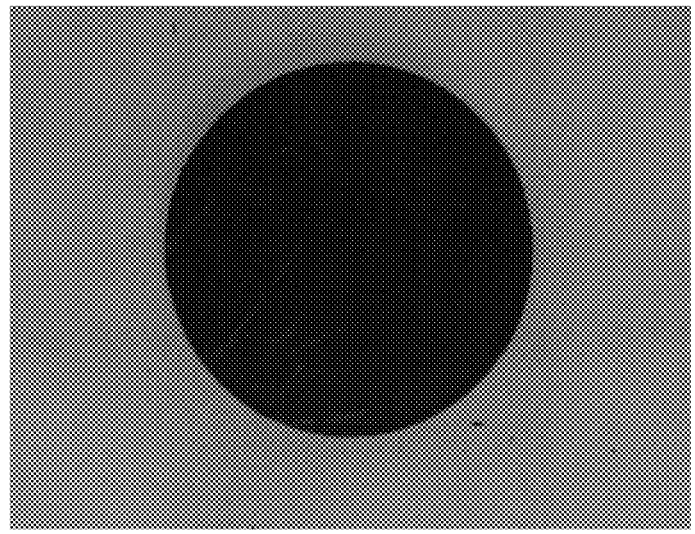
FIGS. 3A and 3B are photographs of electrode pellet and nanostructured separator coated electrode pellet.
Figure 3B:
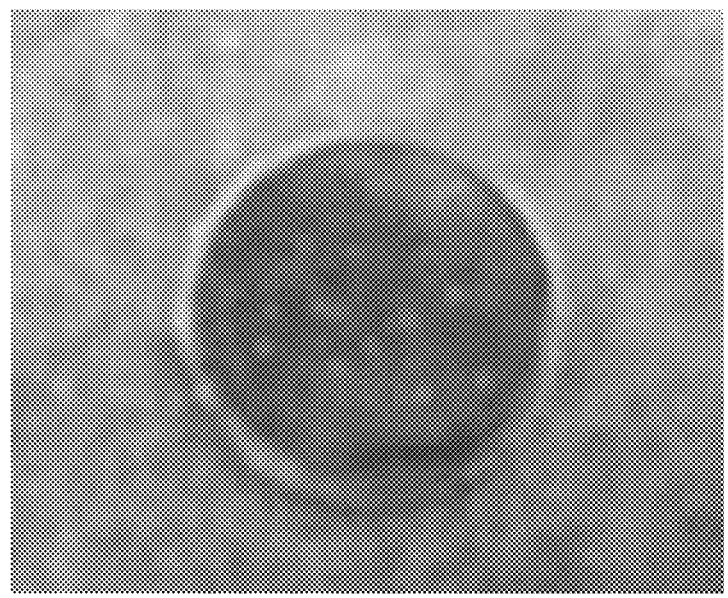
Figure 4A:
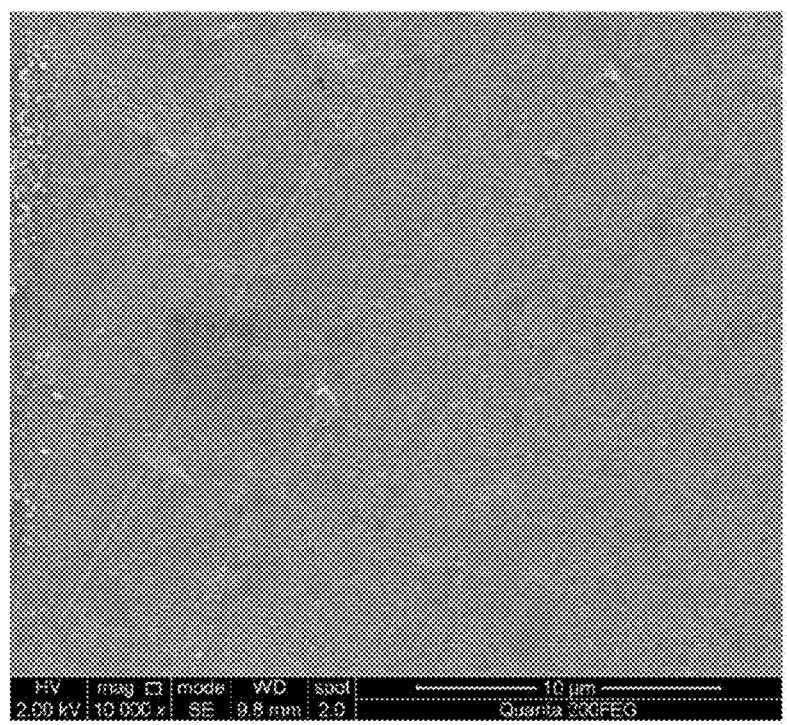
FIGS. 4A and 4B are micrograph images of electrode pellet and nanostructure separator coated electrode pellet.
Figure 4B:
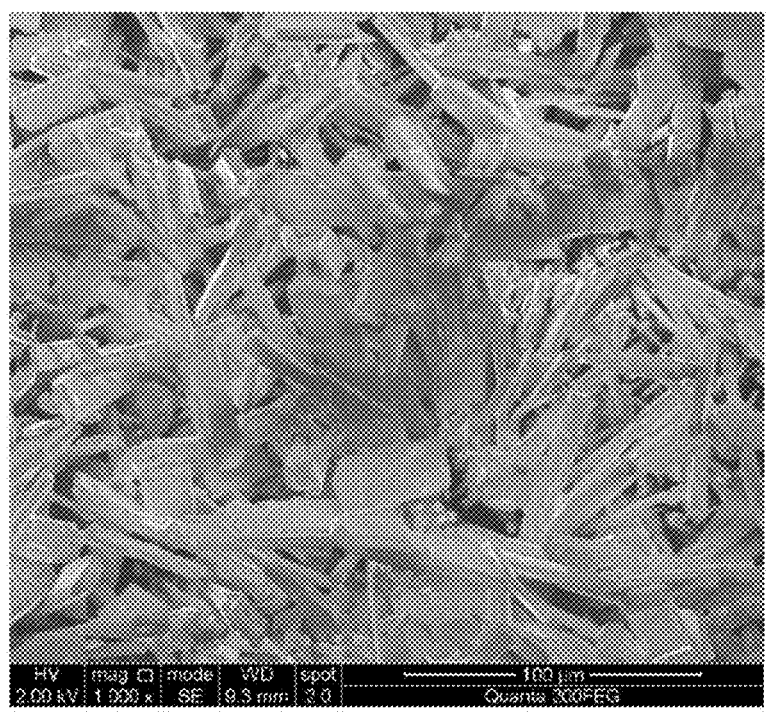
Figure 5A:
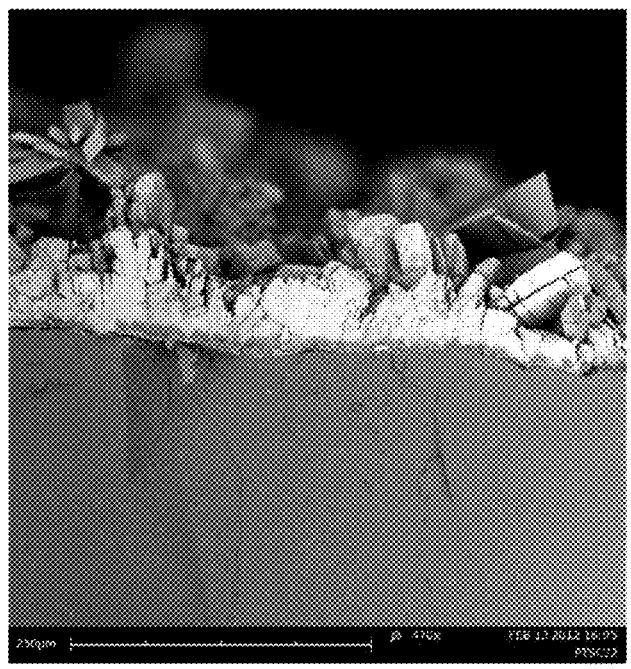
FIGS. 5A and 5B are micrograph images of electrode pellet and nanostructured separator coated electrode pellet.
Figure 5B:
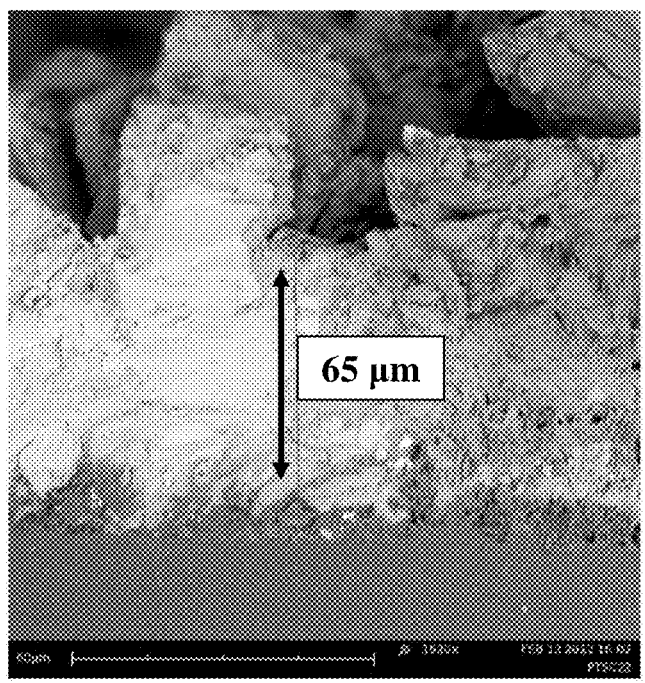

FIGS. 3A and 3B represent photographs of $MnO_2$ press-pellet as substrate (FIG. 3A) and after coating by Zn-terephthalate MOF (FIG. 3B). FIGS. 4A and 4B represent SEM images of the surface of the $MnO_2$ support (FIG. 4A) and after growth of the MOF film on the support (FIG. 4B). FIGS. 5A and 5B represent SEM images showing the cross section of the MOF thin film on top of the $MnO_2$ substrate at two different magnifications. The average cross section of the MOF thin film was 60 microns.

Figure 6:
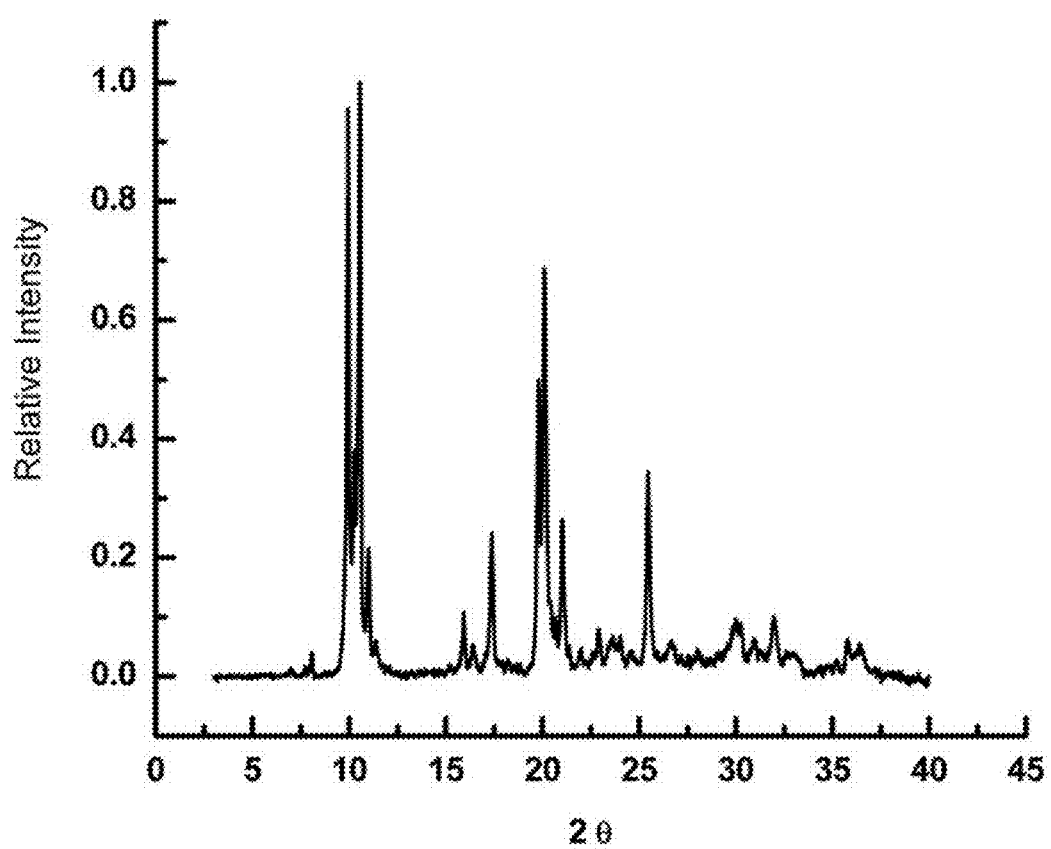
FIG. 6 is a graph depicting the X-ray powder diffraction pattern of the nanostructured separator on the electrode pellet.
Figure 7:
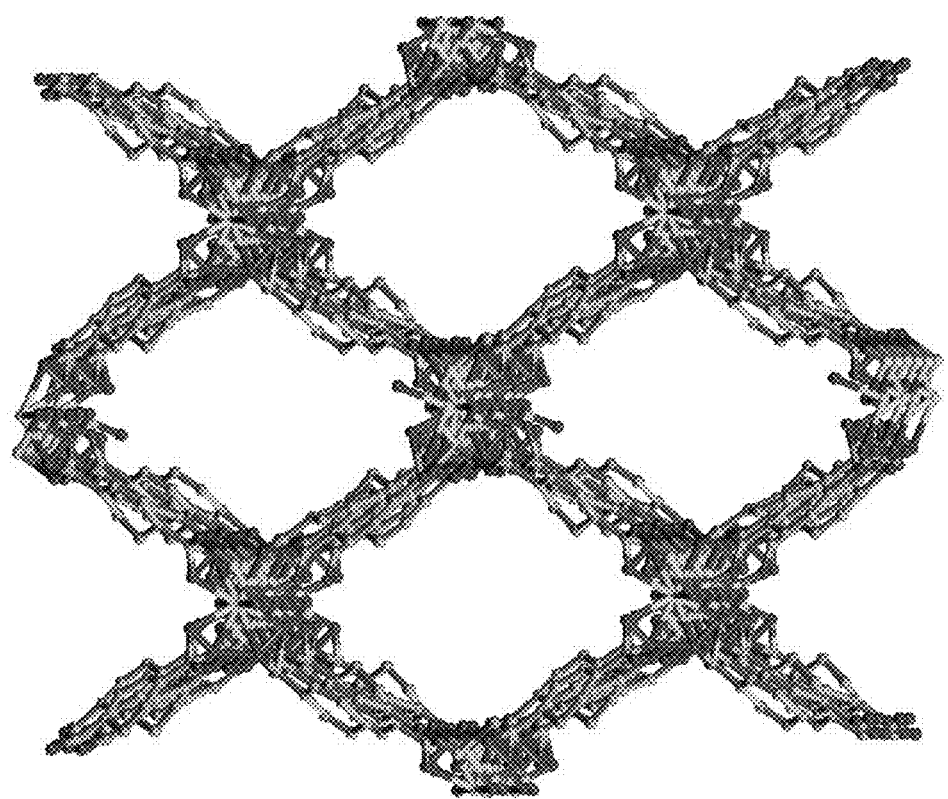
FIG. 7 is a diagram depicting the X-ray crystal structure of the nanostructured separator on the electrode pellet.

Referring to FIG. 6, the X-ray powder diffraction pattern of the Zn-terephthalate MOF film grown on the $MnO_2$ substrate. FIG. 7 represents the X-ray single crystal structure of the Zn-terephthalate MOF film grown on the $MnO_2$ substrate. The disordered parts of the framework, hydrogen atoms and disordered guest solvent molecules are omitted for clarity.

Example 2

180 mg of finely grinded $MnO_2$ was pressed at 15,000 lb/inch$^2$ to prepare the solid support. A mixture of 4,4'-sulfonyldibenzoic acid (0.1 mmol, 30 mg) and $Pb(NO_3)_2$ (0.1 mmol, 33 mg) was prepared and dissolved in N,N'-dimethylformamide (2 mL) and this mixture added to the support in a closed vial, heated at 115° C. for 12 h to result in a homogenous coverage of the substrate by the Pb-(4,4'-sulfonyldibenzoate) MOF.

Figure 8A:
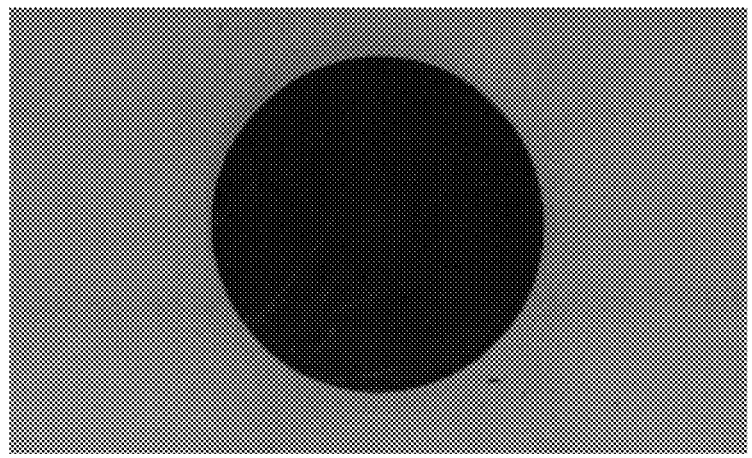
FIGS. 8A and 8B are photographs of electrode pellet and nanostructured separator coated electrode pellet.
Figure 8B:
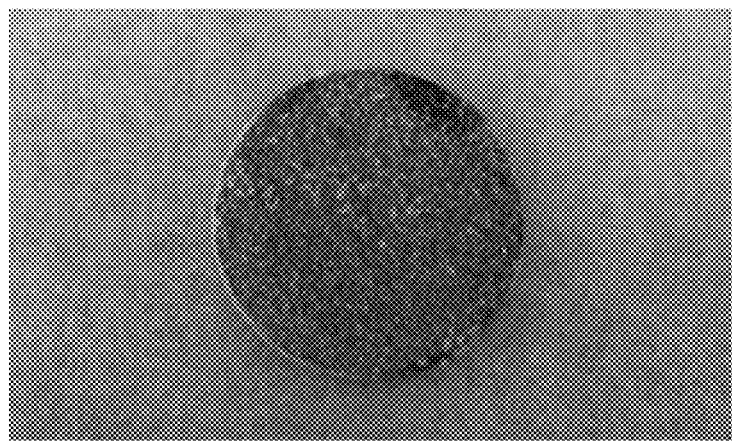
Figure 9A:
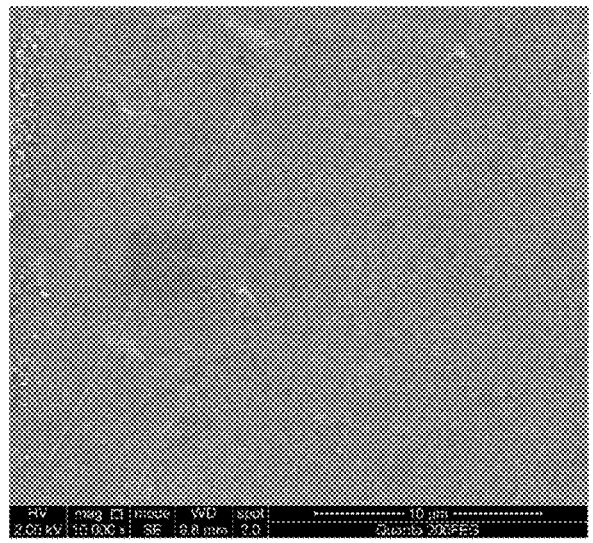
FIGS. 9A and 9B are micrograph images of electrode pellet and nanostructured separator coated electrode pellet.
Figure 9B:
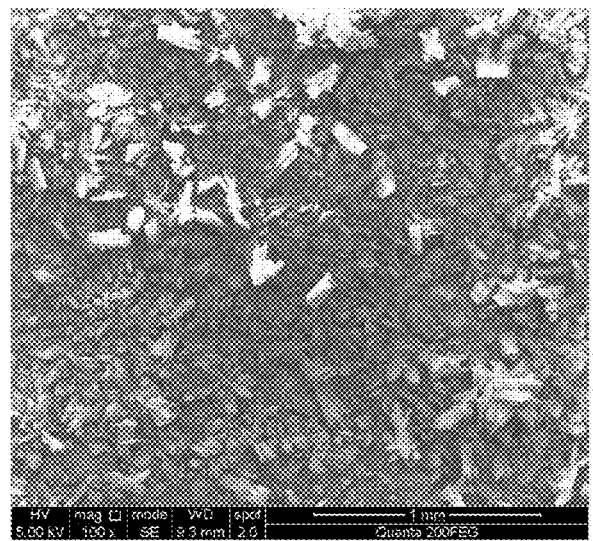

FIGS. 8A and 8B represent photographs of $MnO_2$ press-pellet as substrate (FIG. 8A) and after coating by Pb-(4,4'-sulfonyldibenzoate) MOF (FIG. 8B). FIGS. 9A and 9B represent SEM images of the surface of the $MnO_2$ support (FIG. 9A) and after growth of the Pb-(4,4'-sulfonyldibenzoate) MOF film on the support (FIG. 9B).

Figure 10:
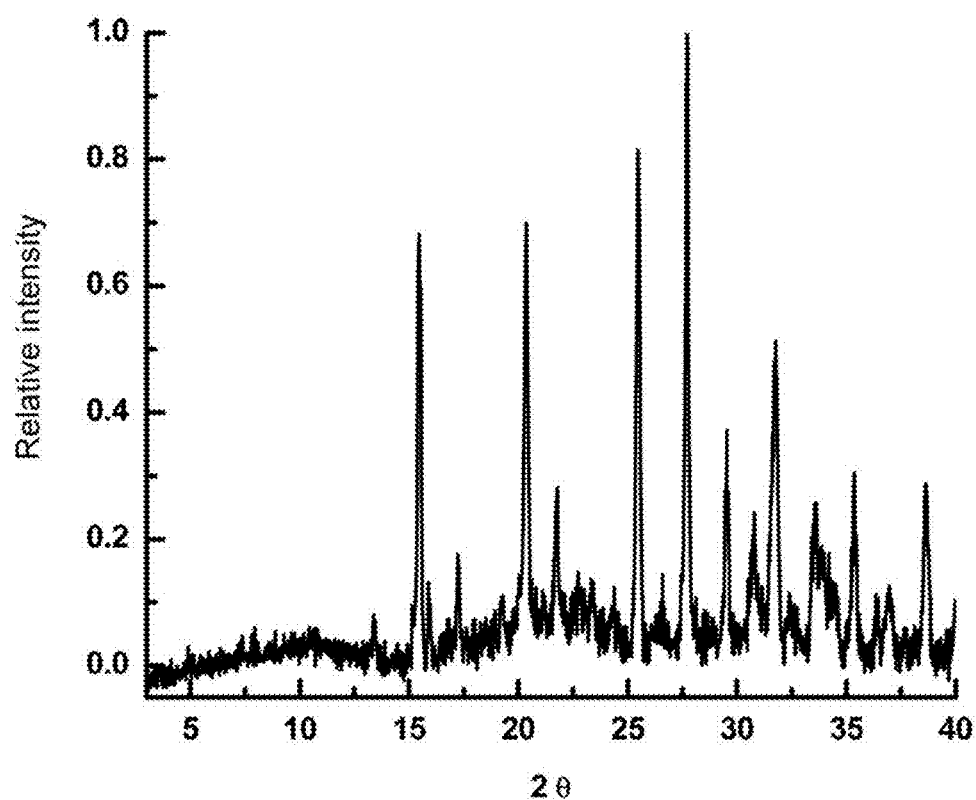
FIG. 10 is a graph depicting the X-ray powder diffraction pattern of the nanostructured separator on the electrode pellet.
Figure 11:
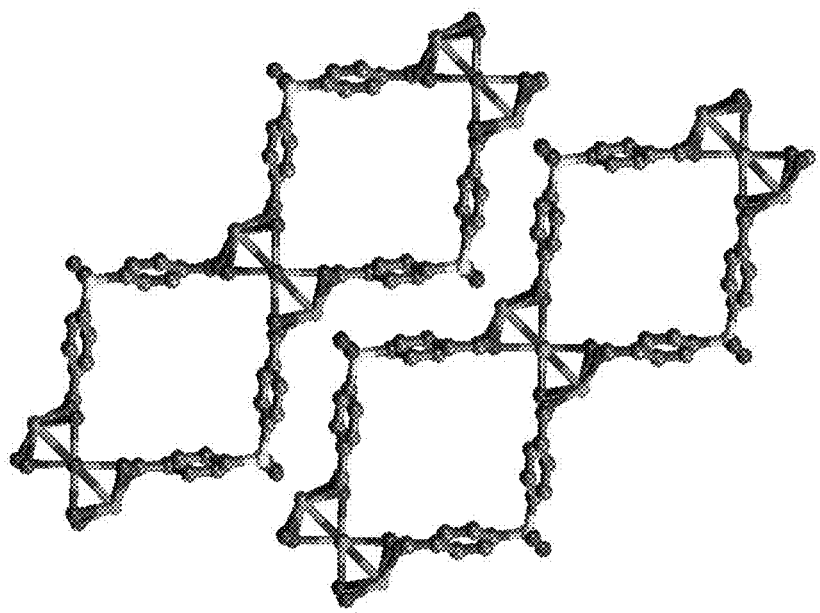
FIG. 11 is a diagram depicting the X-ray crystal structure of the nanostructured separator on the electrode pellet.

Referring to FIG. 10, the X-ray powder diffraction pattern of the Pb-(4,4'-sulfonyldibenzoate) MOF film grown on the $MnO_2$ substrate. FIG. 11 represents the X-ray single crystal structure of the Pb-(4,4'-sulfonyldibenzoate) MOF film grown on the $MnO_2$ substrate. The disordered parts of the framework, hydrogen atoms and disordered guest solvent molecules are omitted for clarity Example 3

Figure 12A:
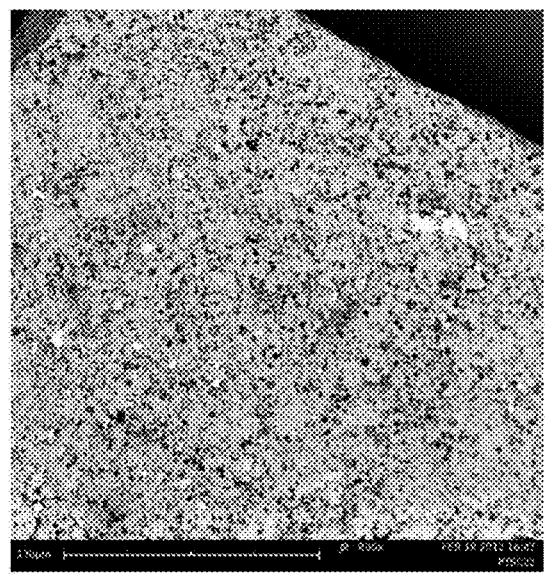
FIGS. 12A and 12B are micrograph images of the surface of an electrode pellet after pellet-press of a nanostructured separator.
Figure 12B:
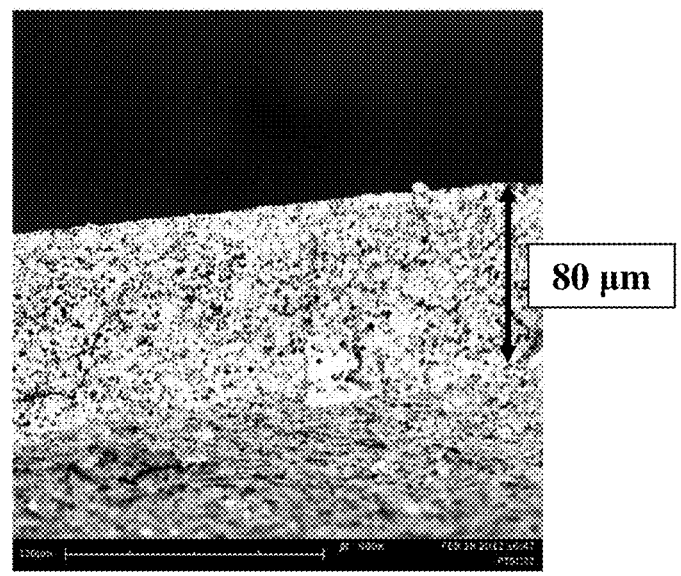
Figure 13:
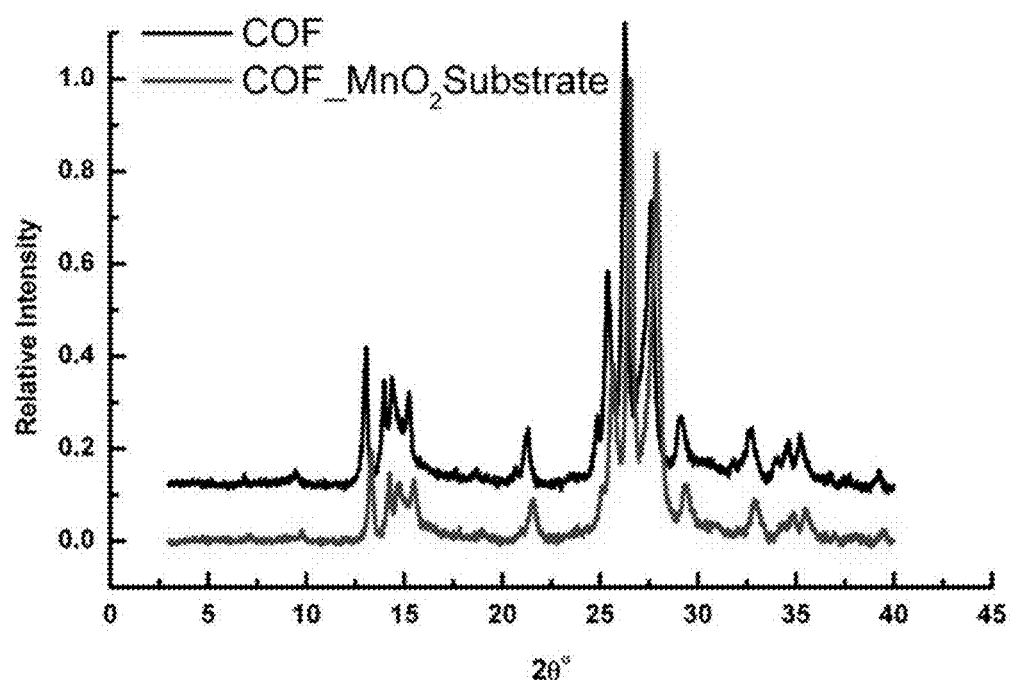
FIG. 13 is a graph depicting the X-ray powder diffraction pattern of the nanostructured separator on the electrode pellet.

A solution of 2,5-thiophenediboronicacid (70 mg) in tetrahydrofuran (2 mL) and toluene (2 mL) was prepared and heated in closed vial at 105° C. for 24 h. The resulting finely crystalline solid was air dried and spread on the surface of gently pressed $MnO_2$ powder (180 mg) inside the pellet-press. The solids were pressed together at 15,000 lb for 5 minutes to result in uniformly covered surface by the COF. FIGS. 12A and 12B represent SEM images of the surface of the $MnO_2$ support after pellet-press of microcrystalline COF into a thin film (FIG. 12A), and side view indicating average cross section of 80 microns (FIG. 12B). Referring to FIG. 13, the X-ray powder diffraction pattern of the 2,5-thiophenediboronicacid COF film grown on the $MnO_2$ substrate.

A number of embodiments of the invention have been described. Nevertheless, it will be understood that various modifications may be made without departing from the spirit and scope of the invention. Other embodiments are within the scope of the following claims.

What is claimed is:

1. A nanostructured electrode separator, consisting essentially of:
   a metal organic material,
   wherein the nanostructured electrode separator is attached to a surface of a manganese oxide electrode, is a phase-pure material, and serves as an electrical insulator between the manganese oxide electrode and a second electrode and has an average pore diameter less than 20 nm and greater than 10 nm.

2. The electrode material of claim 1, wherein the metal-organic material is a metal-organic framework.

3. The electrode material of claim 1, wherein the metal-organic material is a metal-organic polyhedron.

4. The electrode material of claim 1, wherein the metal-organic material is a coordination polymer.

5. The electrode material of claim 1, wherein the nanostructured separator includes a zinc or lead coordination compound.

6. The electrode material of claim 5, wherein the nanostructured separator includes a zinc terephthalate metal-organic framework.

7. The electrode material of claim 5, wherein the nanostructured separator includes a lead-(4,4'-sulfonyldibenzoate) metal-organic framework.

8. The nanostructured electrode separator of claim 1, wherein the metal organic material comprises Zn-MOF1, Zn-MOF2, Zn-MOF3, Zn-MOF4, ZnMOF5, Cu-MOF1, Cu-MOF2, Tb-MOF1, Tb-MOF2, Cd-MOF1, Cd-MOF2, CdMOF3, Co-MOF1, Co-MOF2, Zn-MOF6, MOF-5, Cu(4,4'-bpy)$_{1.5}$NO$_3$(H$_2$O)$_{1.25}$, [Cu$_3$(TMA)$_2$]$_n$, [Cu(OH)—(C$_5$H$_4$NCO$_2$], MOF-38, Ag(4,4'-bpy)NO3, IRMOF-1, IRMOF-2 and IRMOF-3, IRMOF3, IRMOF7, or a supramolecular assembly comprising a 1:8 ratio of a supermolecular polyhedral building blocks and a triangular molecular building blocks which form a (3,24)-connected rht net.

9. An electrochemical cell comprising:
   a first electrode;
   a nanostructured electrode separator consisting essentially of a metal organic material, wherein the nanostructured electrode separator is phase-pure and attached to a surface of the first electrode and has an average pore diameter less than 20 nm and greater than 10 nm; and
   a second electrode electrically insulated from the first electrode by the nanostructured electrode separator, wherein one of the first electrode and second electrode is a manganese oxide electrode.

10. The electrochemical cell of claim 9, wherein the metal-organic material is a metal-organic framework.

11. The electrochemical cell of claim 9, wherein the metal-organic material is a metal-organic polyhedron.

12. The electrochemical cell of claim 9, wherein the metal-organic material is a coordination polymer.

13. The electrochemical cell of claim 9, wherein the nanostructured separator includes a zinc or lead coordination compound.

14. The electrochemical cell of claim 13, wherein the nanostructured separator includes a zinc terephthalate metal-organic framework.

15. The electrochemical cell of claim 13, wherein the nanostructured separator includes a lead-(4,4'-sulfonyldibenzoate) metal-organic framework.

16. The electrochemical cell of claim 9, wherein the metal organic material nanostructured separator comprises Zn-MOF1, Zn-MOF2, Zn-MOF3, Zn-MOF4, ZnMOF5, Cu-MOF1, Cu-MOF2, Tb-MOF1, Tb-MOF2, Cd-MOF1, Cd-MOF2, CdMOF3, Co-MOF1, Co-MOF2, Zn-MOF6, MOF-5, $Cu(4,4'-bpy)_{1.5}NO_3(H_2O)_{1.25}$, $[Cu_3(TMA)_2]_n$, $[Cu(OH)—(C_5H_4NCO_2)]$, MOF-38, $Ag(4,4'-bpy)NO3$, IRMOF-1, IRMOF-2 and IRMOF-3, IRMOF3, IRMOF7, or a supramolecular assembly comprising a 1:8 ratio of a supermolecular polyhedral building blocks and a triangular molecular building blocks which form a (3,24)-connected rht net.

17. The electrochemical cell of claim 9, wherein the second electrode comprises lithium.

* * * * *